Patented Dec. 1, 1942

2,303,436

UNITED STATES PATENT OFFICE 2,303,436

METHOD OF MAKING RIGID ARTICLES

Kempton Clark, Little Compton, R. I., assignor to American Seal-Kap Corporation of Delaware, Wilmington, Del., a corporation of Delaware No Drawing. Application October 23, 1937, Serial No. 170,716

3 Claims. (Cl. 18—56)

This invention relates to the manufacture of articles ultimately of a relatively rigid character, but which may be originally shaped by a molding operation while in a sufficiently plastic condition.

More particularly the articles may be made of an impregnated paper base which can be molded and which thereafter sets or rigidifies permanently in its molded condition and cannot thereafter be softened by heat or other usual treatment.

A further object is to produce articles which are suitable for use in connection with foods of various kinds which will not adversely affect them and which will not be adversely affected by such foods.

Still another object is to provide articles of pleasing appearance, particularly when used with food products. The material is thus suitable for use in the manufacture of milk or other food containers or of container tops or covers, as well as for a great variety of other purposes.

A further object is to make possible cold molding of the articles so that they may be produced rapidly.

In order to attain these and other objects which will later more fully appear, use is made in accordance with this invention of a condensation product as the stiffening agent, and for the purpose of conditioning the paper base for molding, this invention makes use of such a condensation product, the sources of which may be introduced into the paper as a liquid, as in a, preferably, aqueous vehicle.

Stiffening materials particularly suitable for the purposes of this invention are the urea resins which may form colorless aqueous syrups which do not color materials treated therewith, and when set are hard, clear and transparent, free from odor and inert to constituents of food products. Most other resins are dark colored and discolor materials impregnated by them.

For example, such resins may be formed by the action of an aldehyde on urea or an urea derivative or combinations or mixtures of these. It will usually be found most economical to use commercial formaldehyde containing from 37% to 40% as the aldehyde. The urea derivatives may be, for example, but without limitation thereto, acetyl or benzyl carbamid or thiocarbamilide, guanidine, thiourea, or the like. The materials may be combined with the aldehyde in rather widely varying proportions, for example, from say 5 mols of the aldehyde to 1 mol of urea, or its derivative, to 1½ mols of aldehyde to 1 mol of urea or its derivative, or in even wider proportions desired for any particular reason.

Certain specific formulae which have been used successfully are as follows:

1.

| | | |
|---|---|---|
| 40% formaldehyde neutralized to methyl red | cc | 1000 |
| Aqua ammonia | do | 37 |
| Thiourea | grams | 335 |
| Urea | do | 260 |

2.

| | | |
|---|---|---|
| Commercial formaldehyde | parts by weight | 52 |
| Urea, preferably heated to boiling | parts | 12 |

3.

| | | |
|---|---|---|
| Commercial formaldehyde | parts by weight | 58 |
| Urea | parts | 15 |
| Acetic acid | do | 2 |

4.

| | | |
|---|---|---|
| Formaldehyde | cc | 300 |
| Urea | grams | 60 |
| Sodium hydroxide | do | 2 |
| Phenol | do | 5 |

The first of these examples shows the use of an alkaline catalyst, which is the neutralizing agent, and a retarder comprising the ammonia, the second illustrates the use of heat without a catalyst, the third illustrates the use of an acid catalyst. The fourth illustrates the use of an alkaline catalyst together with a later acidifying action and coupled with that a modification of the urea condensation product through presence of a condensation product of formaldehyde and phenol, the phenol acting to combine with some of the excess of formaldehyde. Many other organic acids may be used in place of the phenol and produce a hardening or accelerating action on the condensation product. If the initial reaction produced is acid, it will set in time without the application of heat.

The initial condensation product is a colloidal dispersion in water which may be diluted to any desired extent provided proper conditions as to alkalinity, temperature, etc., depending on the particular material, are maintained and is in condition for introduction into the paper base. In many cases the dispersion may be used as an impregnant directly in its concentrated form without dilution. Or in some cases it may be desired to employ with or without diluting water some other liquid such as low boiling solvent as ether or alcohol, or a high boiling solvent as glycerine, ethylene glycol or the like. After the paper has been impregnated with such a solution the condensation product may be made to harden by any one of several different methods. It may be hardened by being subjected to heat and pressure, or if left to itself it will harden in time while cold, or by evaporation of water or other solvent, and if set when in acid condition, it is highly resistant to the action of solvents thereafter.

The time required for setting of the condensation product without high heat and pressure may be predetermined within reasonable limits by the use of suitable quantities of various retarding agents as alkalies or of various hardening or accelerating agents such as the salts of weak bases and strong acids, or the acids themselves. Examples of such compounds are the sulphates, chlorides, nitrates or acetates or ammonia, acetic acid, or phthalic anhydrides, aluminum chloride, and there are a great many others. The ammonium sulphate, for example, reacts to liberate ammonia and sulphuric acid. The sulphuric acid then acts as an accelerator while the ammonia reacts with the formaldehyde to form hexamethylenetetramine. One of the advantages of the use of such a salt over the use of the acid itself is that it may be incorporated in the paper before it is subjected to the impregnation and does not adversely affect the paper should it be present therein for a considerable time before the paper is impregnated. It may, if desired, be incorporated in the paper during its manufacture in a manner similar to methods commonly employed in tub-sizing paper, or it may be put in in the calendering operation as in effecting a water finish or otherwise.

In some cases the presence of this material in the paper may cause the paper to be sticky at the time when it is desired to mold it into the desired articles, though under other conditions there may be no such tendency. In order to overcome any sticking, the saturated paper may be further impregnated with a small amount, say, 1% or 2% by weight of a low melting stiffening agent or a wax-like substance such as paraffin or other wax, a metallic or other soap, or a thermoplastic resin or mixtures or combinations of such materials. This may be done by any suitable means, but one method which has been found very satisfactory is to pass the paper while still wet from the impregnating treatment through the molten waxy materials heated to a temperature above the boiling point of the solvent. This causes a portion of the water or other solvent within the paper to vaporize and as the paper cools thereafter a partial vacuum is produced in the paper which acts to draw the molten waxy materials into the pores and, interstices thereof before they have cooled sufficiently to prevent such action. It may, however, be found desirable in some cases not to impregnate the paper base with the waxy material, but to apply it substantially entirely as a surface coating. In such a case it may be applied to the surface of the paper only under such conditions that it does not tend to materially penetrate the paper and it may, if desired, be under such temperature conditions as to accelerate the setting of the condensation product.

Where the molding operation is effected under very high pressure and sufficient heat, the resin may be rigidified at once, but where this is not desired the pressure may be only that required to mold the articles to shape and without the application of heat. Besides the function of such waxy materials in preventing sticking of the paper to the forming dies, it may also have the important function when used in sufficient quantity, say, 25% to 100%, or more, by weight of fibrous base, of supporting the material in its molded condition through its inherent normal rigidity while the condensation product is still in an unset condition and the impregnated base would otherwise be too flabby to maintain its molded form during setting. This may be of advantage, for example, in articles which require considerable molding such as milk bottle caps of the cover-all type which cover the pouring lip of the bottle as well as engage the usual disk seat.

It is thus possible to cold mold the articles one after another with great rapidity since it is quite unnecessary to retain the molded article in the mold after it has been shaped as it would be were it necessary to subject the article to heat and pressure to produce setting.

If desired after the condensation product has set, any such waxy materials may be removed or extracted as by the use of a suitable solvent, but in many cases the continued presence of such materials may have no deleterious effects or may add desirable qualities to the completed articles. For example, in the case of containers or container covers for liquids these materials may impart additional water-proofing characteristics or a desirable finish. In some cases the presence of a thermoplastic adhesive surfacing material may facilitate the sealing of the article to other objects, as for example, to seal a container cover containing such material to a receptacle where the receptacle is heated when filled or as a subsequent operation. Or such thermoplastic materials may be of importance in effecting the adhesion of laminations where laminated articles are to be made.

One of the great advantages of using condensation products of this type as an ingredient for paper articles lies in the fact that commercial formaldehyde, urea, and other ingredients may ordinarily be used, this being very much cheaper than the chemically pure materials usually found necessary where articles are to be molded under heat and pressure from the condensation products with or without the presence of fillers such as wood flour, fiber, pigments, or the like. Impurities in the materials used are not so apparent in the impregnated article as in the articles molded under heat and pressure, nor do they as a rule hinder in any way the formation of the paper into the desired articles.

The resultant product may be of attractive appearance and is thus able to compete on favorable terms with articles molded from the more expensive, pure, raw materials and articles made from metal or other commonly accepted materials. It has the further advantage over many such materials because of its light color and because of its appearance of cleanliness and sanitation when used in connection with food products and its freedom from deleterious effect on such products or impairment of its appearance by contact therewith.

In some instances it may be desired to stiffen the entire article, and in other cases only certain parts of the article. For example, the article may be a closure cap for milk bottles or other containers having a marginal skirt extending down on the outside of the bottle, and it may be of the general type illustrated in the Baum Patent No. 1,668,349 granted May 1, 1928, having a bore-covering portion surrounded by a rim generally U-shaped in cross section which in use covers over the pouring lip of the bottle and the outer wall of which forms the cap skirt. Such a cap may be stamped or molded from a blank disk of treated paper. Where it is desired to stiffen the entire cap the disk or blank is passed through the aqueous solution of the condensation product and then through the hot wax. Where it is desired to stiffen only the pouring lip housing or the skirt, the desired width of the marginal portion of the disk has applied thereto the stiffening solution, either before or after the blank disk has been passed through a water bath, and after both these treatments the blank is passed through the hot wax to partially vaporize the water both in the part to be siffened by the set resin and in the remainder of the cap as well. When the blanks thus pretreated have been allowed to temper to molding condition, they are molded cold. The subsequent setting of the resin in those portions containing it will then give the desired permanent hardness and stiffness while the wax will serve as a more or less temporary support to hold the molded cap in shape until the resin has set. Particularly where cold molding is practiced, treatment to remove traces of formaldehyde in the molded articles may sometimes be found desirable.

This application is a continuation in part of my application Serial No. 720,065, filed April 11, 1934, for Rigid articles and method of making the same.

I claim:
1. The method which comprises impregnating a paper base with a dispersion of urea resin and a stiffening agent, cold molding the impregnated base into a desired article, and permitting the resin to harden, said agent being of a character and sufficient in quantity to cause said article to retain its molded shape until such resin has become rigidified.

2. The method which comprises saturating a fibrous blank with an aqueous dispersion of the initial condensation product of urea and an aldehyde, passing the blank through molten thermoplastic material at a sufficiently high temperature to vaporize a portion of the water in the saturant and thereby cause subsequent penetration into said blank of such thermoplastic material, cold-molding the blank into an article, and then permitting the condensation product to rigidify while the article is maintained in formed condition at least in part of said thermoplastic material.

3. The method which comprises saturating a fibrous blank with an aqueous dispersion of the initial condensation product of urea and an aldehyde in the presence of an ammonium salt, passing the blank through molten thermoplastic material at a sufficiently high temperature to vaporize a portion of the water in the saturant and thereby cause subsequent penetration into said blank of such thermoplastic material, cold-molding the blank into an article, and then permitting the condensation product to rigidify while the article is maintained in formed condition at least in part by said thermoplastic material.

KEMPTON CLARK.

CERTIFICATE OF CORRECTION.

Patent No. 2,303,436. December 1, 1942.

KEMPTON CLARK.

It is hereby certified that error appears in the printed specification of the above numbered patent requiring correction as follows: Page 3, second column, line 21, claim 2, for "part of" read --part by--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.